United States Patent
Maino et al.

(10) Patent No.: US 9,887,936 B2
(45) Date of Patent: Feb. 6, 2018

(54) APPLICATION IDENTIFICATION AND OVERLAY PROVISIONING AS A SERVICE

(71) Applicant: Cisco Technology, Inc., San Jose, CA (US)

(72) Inventors: Fabio Maino, Palo Alto, CA (US); Vina Ermagan, Marina Del Rey, CA (US); Christopher Spain, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 14/816,406

(22) Filed: Aug. 3, 2015

(65) Prior Publication Data
US 2017/0041246 A1 Feb. 9, 2017

(51) Int. Cl.
*H04L 12/911* (2013.01)
*H04L 12/851* (2013.01)
*H04L 12/741* (2013.01)

(52) U.S. Cl.
CPC ............ *H04L 47/825* (2013.01); *H04L 45/74* (2013.01); *H04L 47/24* (2013.01)

(58) Field of Classification Search
CPC ........ H04L 47/825; H04L 47/24; H04L 45/74
See application file for complete search history.

(56) References Cited

U.S. PATENT DOCUMENTS

| | | | |
|---|---|---|---|
| 7,873,060 B2 * | 1/2011 | Luo | ......................... H04L 12/24 370/401 |
| 7,913,529 B2 | 3/2011 | Bagepalli et al. | |
| 7,987,264 B1 * | 7/2011 | Gill | ..................... H04L 41/0816 370/392 |
| 8,817,625 B1 | 8/2014 | Zhang et al. | |
| 2014/0245395 A1 * | 8/2014 | Hulse | ..................... H04L 63/101 726/4 |
| 2015/0271270 A1 * | 9/2015 | Edlund | ................. H04L 67/148 709/227 |

FOREIGN PATENT DOCUMENTS

WO    WO 2009052749 A1 *  4/2009  .......... H04W 76/022

OTHER PUBLICATIONS

English translation of WO 2009052749 A1, Apr. 2009, (Zhang Wei et al.), [database online], [retrieved on Dec. 7, 2016]. Retrieved from World Intellectual Property Organization Patentscope Database using Internet: <URL: https://patentscope.wipo.int/search/en/detail.jsf?docId=WO2009052749&recNum=4&max>, pp. 1-5.*

(Continued)

*Primary Examiner* — Omar Ghowrwal
(74) *Attorney, Agent, or Firm* — Parker Ibrahim & Berg LLC; James M. Behmke; Stephen D. LeBarron

(57) ABSTRACT

In one embodiment, a first device in a network receives application traffic sent from a source device towards a destination address. The first device sends the application traffic to a traffic identification service. The first device receives an instruction to establish a network tunnel to send the application traffic from the source device towards the destination address. The instruction is based on a classification of the application traffic by the traffic identification service. The first device establishes the network tunnel to send the application traffic from the source device towards the destination address.

22 Claims, 20 Drawing Sheets

(56) References Cited

OTHER PUBLICATIONS

Paula Bernier "Service Chaining Seems Important, but What Is It Again?"; SDN Zone; Dec. 6, 2013; pp. 1-3.
"Cisco Locator/ID Separation Protocol and Overlay Transport Virtualization Data Center Infrastructure Solutions for Distributed Data Centers" CISCO; pp. 1-5.
Omar Sultan "Why You'll Want LISP Routing—Part 1", CISCO Blog; Nov. 1, 2012; pp. 1-10.
Omar Sultan "Why You'll Want LISP Routing—Part 2", CISCO Blog; Nov. 5, 2012; pp. 1-13.
Hui et al., "Compression Format for IPv6 Datagrams Over IEEE 802.15.4-Based Networks", Internet Engineering Task Force (IETF), Request for Comments: 6282, Sep. 2011.
Shelby et al., "Neighbor Discovery Optimization for IPv6 over Low-Power Wireless Personal Area Networks (6LoWPANs)", Internet Engineering Task Force (IETF), Request for Comments: 6775, Nov. 2012.
Winter et al., "RPL:IPv6 Routing Protocol for Low-Power and Lossy Networks", Internet Engineering Task Force (IETF), Request for Comments: 6550, Mar. 2012.
Vasseur et al., "Routing Metrics Used for Path Calculation in Low-Power and Lossy Networks", Internet Engineering Task Force (IETF), Reqeust for Comments: 6551, Mar. 2012.
Thubert et al., "Objective Function Zero for the Routing Protocol for Low-Power and Lossy Networks (RPL)", Internet Engineering Task Force (IETF), Request for Comments: 6552, Mar. 2012.

\* cited by examiner

APPLICATION IDENTIFICATION AND OVERLAY PROVISIONING AS A SERVICE

TECHNICAL FIELD

The present disclosure relates generally to computer networks, and, more particularly, to application identification and overlay provisioning as a service in a network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

A larger number of applications are making their way into LLNs. For example, certain LLN devices deployed in a location may be operable to provide monitoring or surveillance data to a supervisory application. In another example, a supervisory application may provide control commands to one or more LLN devices, such as actuators, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
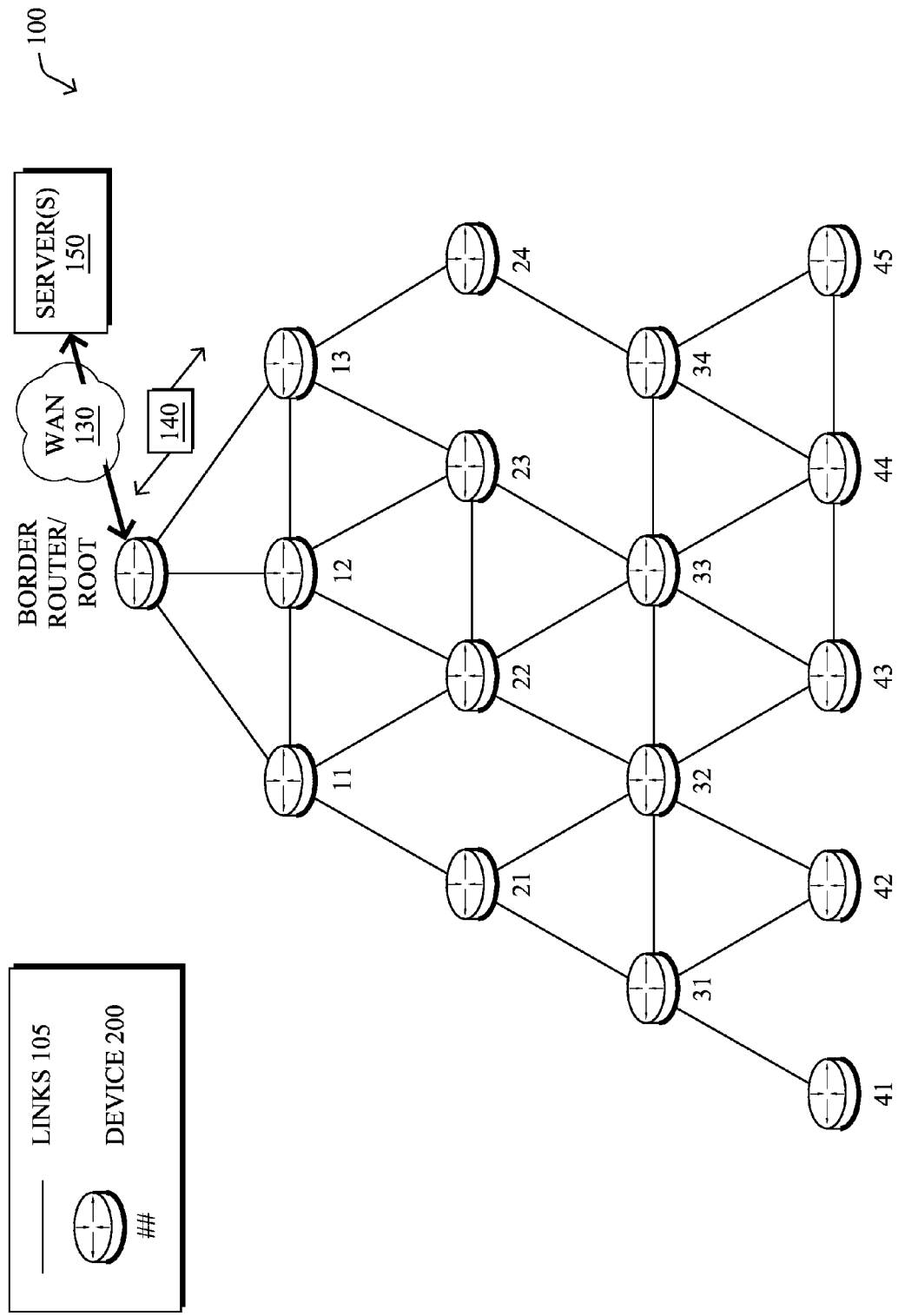
FIG. 1 illustrates an example communication network.

According to one or more embodiments of the disclosure, a first device in a network receives application traffic sent from a source device towards a destination address. The first device sends the application traffic to a traffic identification service. The first device receives an instruction to establish a network tunnel to send the application traffic from the source device towards the destination address. The instruction is based on a classification of the application traffic by the traffic identification service. The first device establishes the network tunnel to send the application traffic from the source device towards the destination address.

In further embodiments, a first device in a network hosting a traffic identification service receives application traffic sent from a source device towards a destination address. The first device classifies the application traffic using a traffic identification service. The first device causes a tunnel overlay to be established in the network for the classified application traffic.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, a "Border Router/Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Border Router/Root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, a server hosting an application identification service, etc. In some embodiments, network 100 may include a plurality of Border Routers/Root nodes that form a backbone of border routers to which nodes 11-45 etc. may join for routing purposes. Those skilled in the art will understand that any number of nodes, devices, links, etc. may be used in the computer network, and that the view shown herein is for simplicity. Also, those skilled in the art will further understand that while the network is shown in a certain orientation, particularly with a "Border Router/Root" node/device, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi™, Bluetooth®, etc.), PLC protocols, or other shared-media protocols where appropriate. In this context, a protocol consists of a set of rules defining how the nodes interact with each other.

Figure 2:
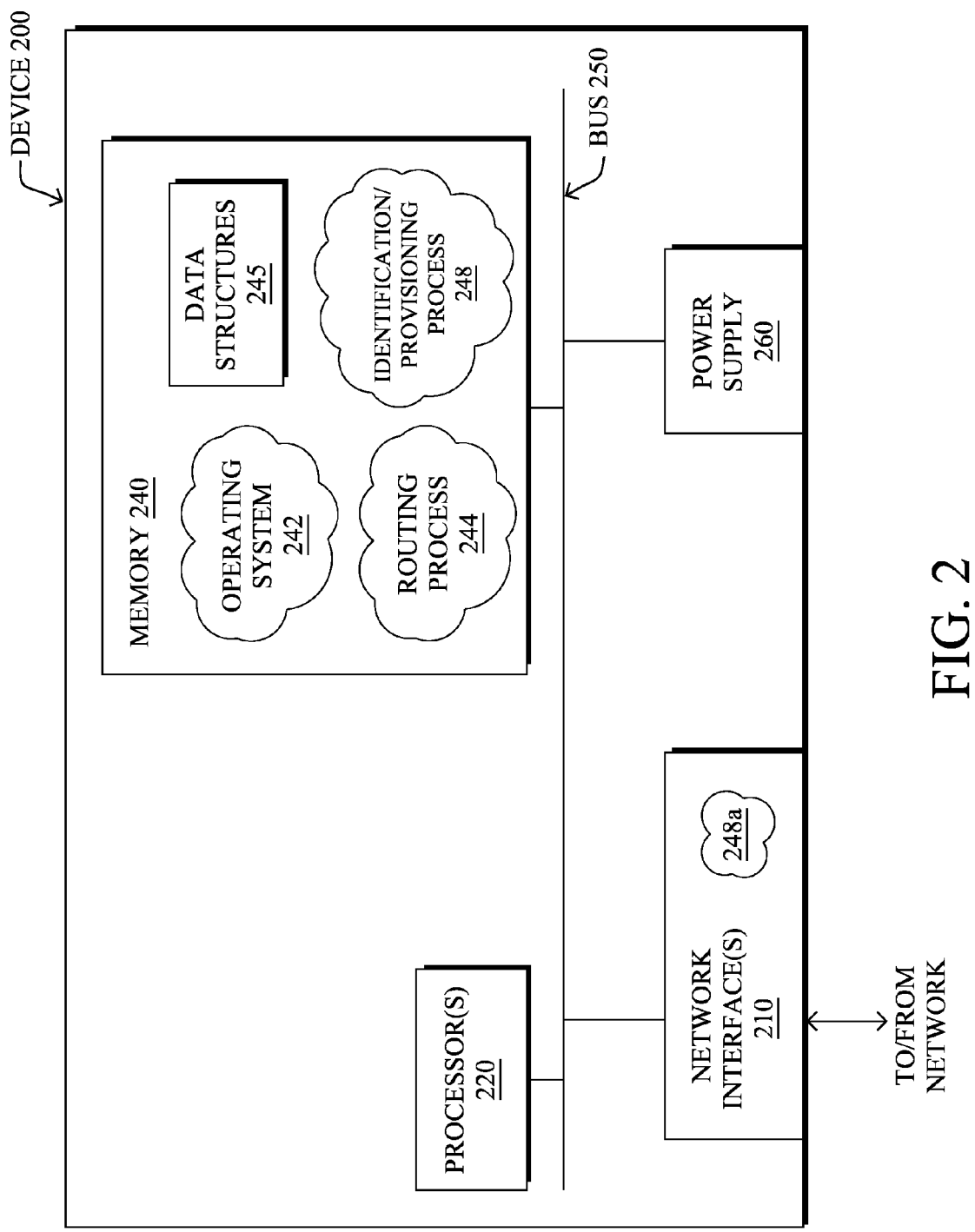
FIG. 2 illustrates an example network device/node.

FIG. 2 is a schematic block diagram of an example node/device 200 that may be used with one or more embodiments described herein, e.g., as any of the nodes shown in FIG. 1 above or described below and/or servers 150. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The is network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and/or an illustrative application identification/network provisioning process 248, as described herein. Note that while process 248 is shown in centralized memory 240, alternative embodiments provide for the process to be specifically operated within the network interfaces 210 (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In some cases, routing process 244 may support the use of the Internet Protocol version 6 (IPv6) within a wireless personal area network (WPAN), such as those formed using 802.15.4 wireless links between devices/nodes. For example, routing process 244 may support the IPv6 Over Low Power WPAN (6LoWPAN) Protocol specified in the Internet Engineering Task Force (IETF) Request for Comment (RFC) 6282 entitled, "Compression Format for IPv6 Datagrams over IEEE 802.15.4-Based Networks," by Hui, et al. (September 2011). The IETF RFC 6775 entitled, "Neighbor Discovery Optimization for IPv6 over Low-Power Wireless Personal Area Networks (6LoWPANs)," by Shelby et al. (November 2012) provides neighbor discovery techniques that routing process 244 may also use to form a 6LoWPAN.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to is uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an IETF Proposed Standard, RFC 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. Number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination is information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
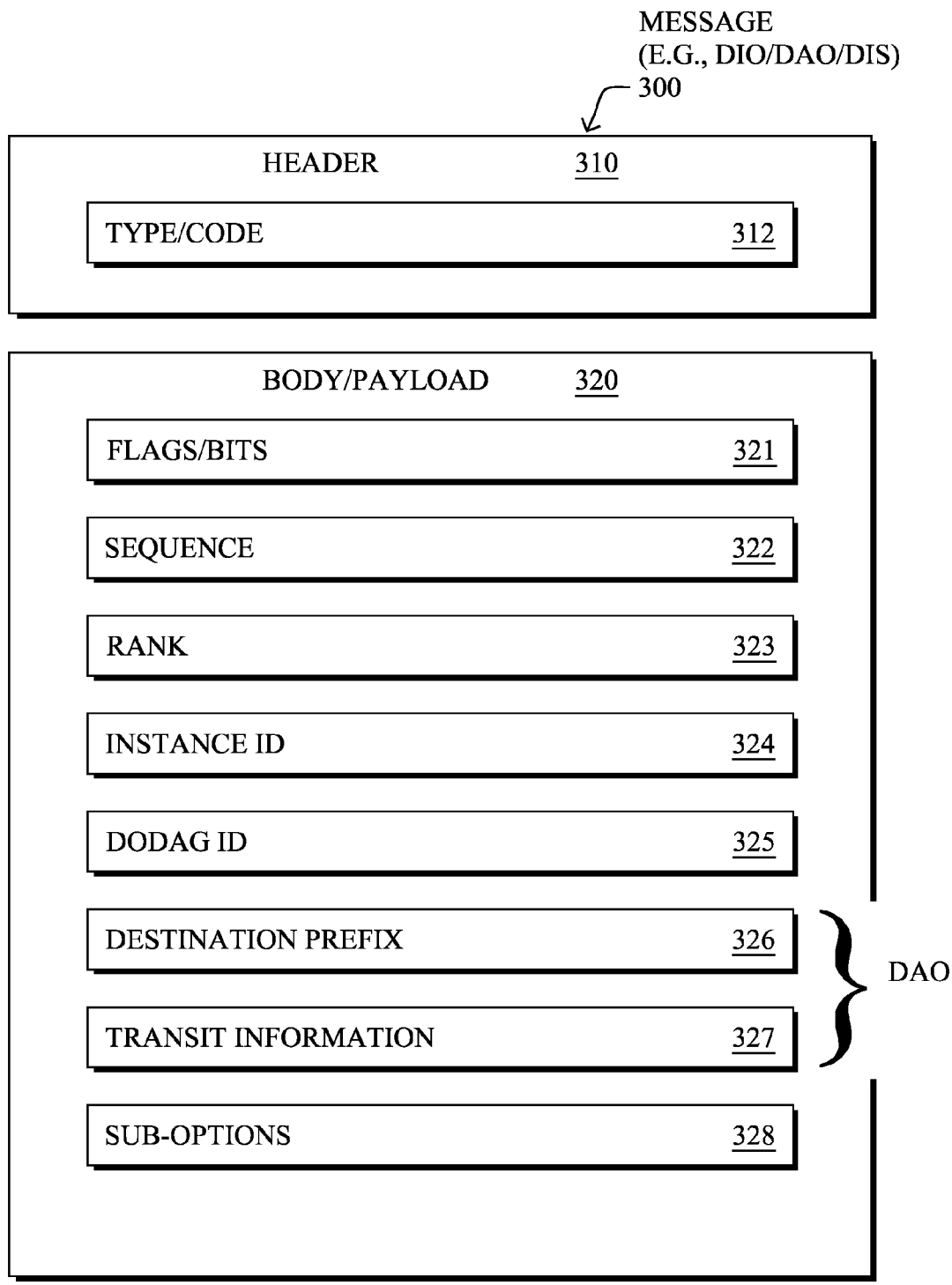
FIG. 3 illustrates an example routing protocol message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific is code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
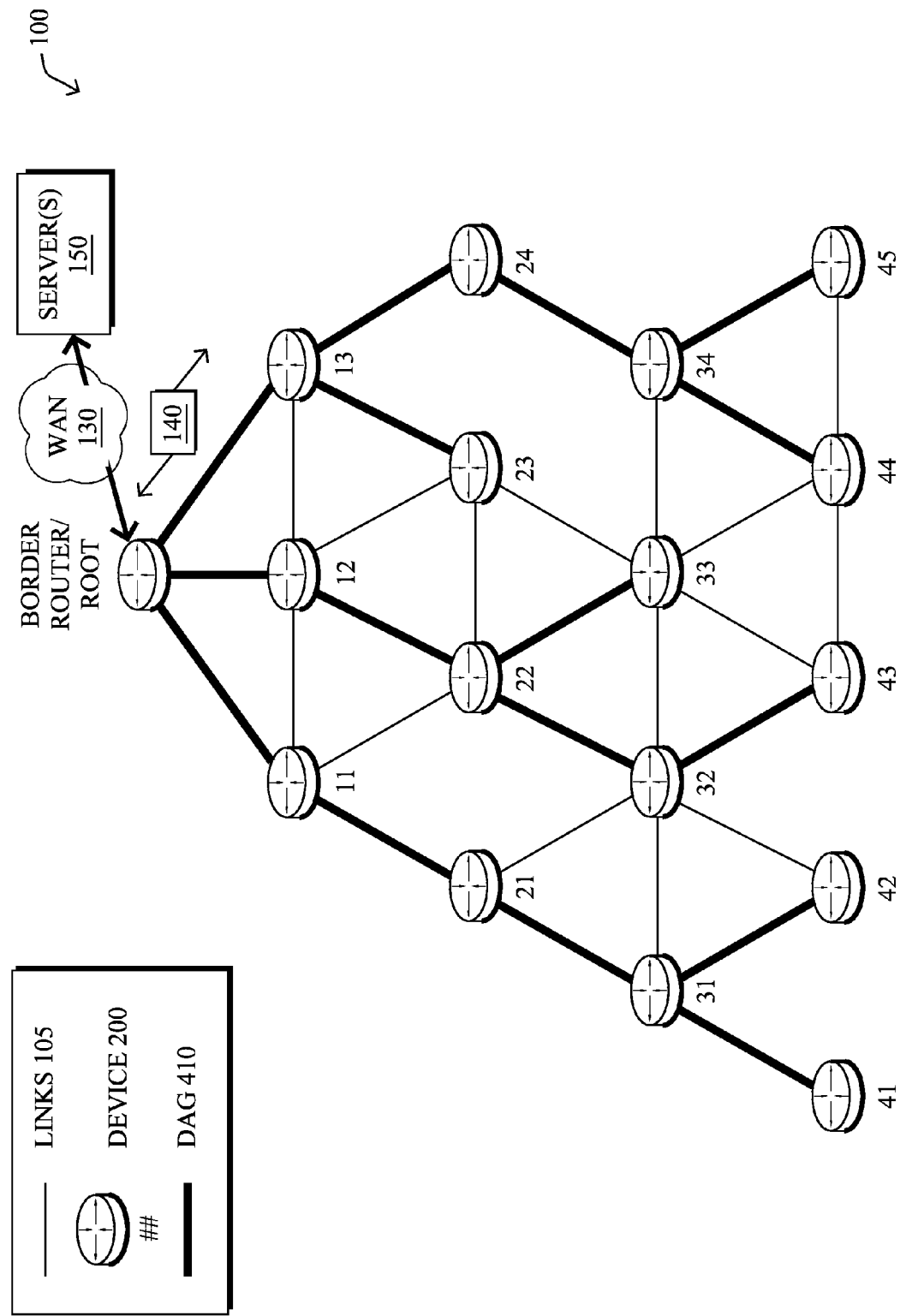
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, a large number of applications are now appearing in LLNs. Such applications may generally provide monitoring of deployed LLN devices and/or control over the deployed devices. For example, consider the case of security cameras deployed in an LLN. In such a case, the cameras may provide video data to a central monitoring application for review by security personnel. However, to properly deploy a device associated with a particular application in an LLN, this requires 1.) identifying the application and the device, and 2.) provisioning the network to support the corresponding application traffic in terms of segmentation, transport, and security.

Application Identification and Overlay Provisioning as a Service

The techniques herein provide network services to automatically identify an application associated with traffic sent by a source device and, in turn, provision the network to support the traffic. In some aspects, service chaining may be used to send the traffic to an application identification service that is in communication with a network controller operable to provision the network (e.g., according to application-specific policies). In further aspects, the provisioning may entail configuring a tunnel-based overlay for the network. Such an overlay may allow for address mobility of the destination address for the application traffic, thereby allowing the destination application of the traffic to be seamlessly moved across data centers, within the cloud, etc.

Specifically, according to one or more embodiments of the disclosure as described in detail below, a first device in a network receives application traffic sent from a source device towards a destination address. The first device sends the application traffic to a traffic identification service. The first device receives an instruction to establish a network tunnel to send the application traffic from the source device towards the destination address. The instruction is based on a classification of the application traffic by the traffic identification service. The first device establishes the network tunnel to send the application traffic from the source device towards the destination address.

Illustratively, the techniques described herein may be performed by hardware, software, and/or firmware, such as in accordance with the identification/provisioning process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, the techniques herein may utilize an application identification service in conjunction with a network controller. In some embodiments, the application identification service may identify the application associated with traffic from a new or otherwise unrecognized device in the network. Based on the classification of the traffic, the network controller may then adjust a programmable, virtual private network (VPN) tunnel-based overlay for the network, to support the device and the application traffic.

FIGS. 5A-5F illustrate example tunnel overlays for an application in a network, according to various embodiments. As shown generally in FIGS. 5A-5F, consider the example whereby node 45 belongs to the LLN that is rooted/serviced by the border router/root node BR shown. Border router BR may be in communication with various other devices via WAN 130, which may include the Internet, a private MPLS network, or the like. These devices may include a network controller 502, an application identification engine 504, and one or more application servers 522 (e.g., AS-1, AS-2, etc.) connected to WAN 130 via routers 520.

Figure 5A:
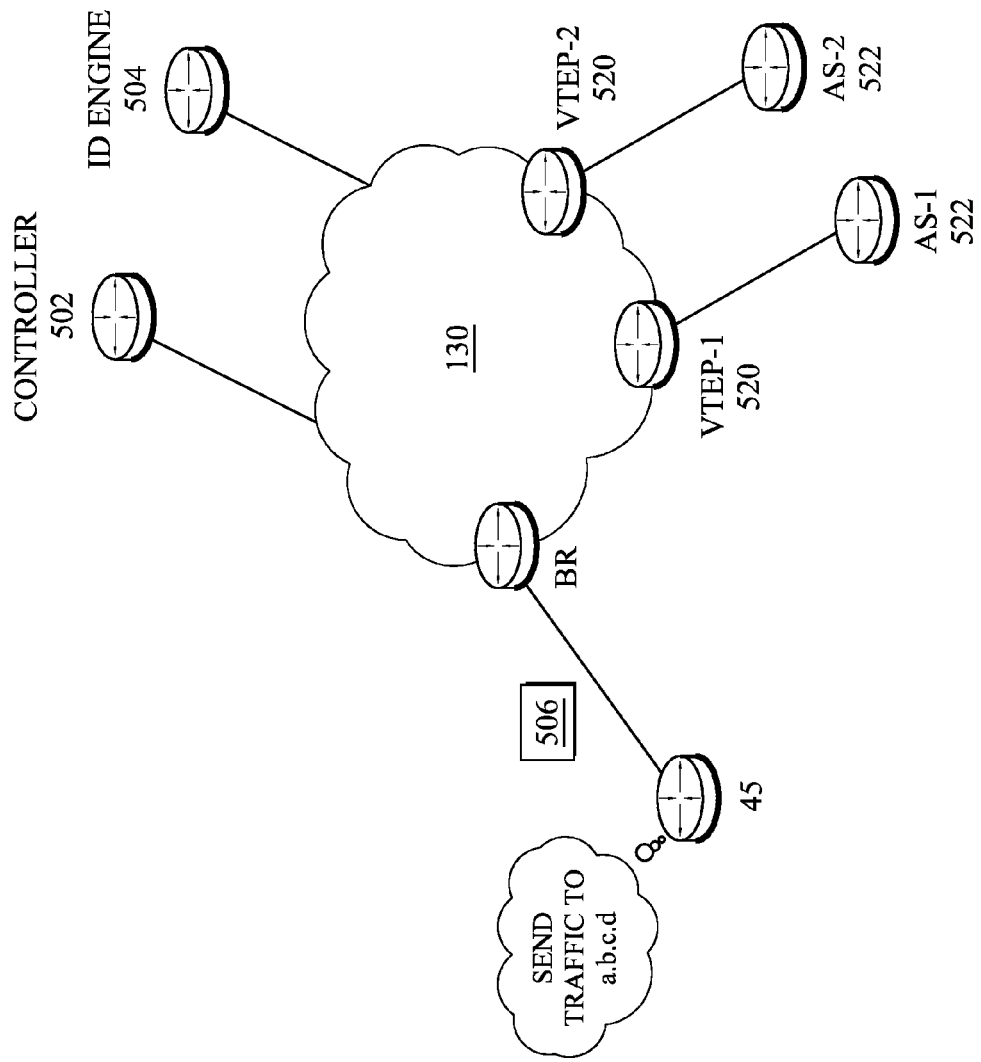
FIGS. 5A-5F illustrate example tunnel overlays for an application in a network.

As shown in FIG. 5A, node/device 45 may send traffic 506 towards a destination address. In many cases, traffic 506 and the destination address may be associated with a particular application. For example, if source device 45 is a security camera, it may send video traffic towards a security/supervisory application hosted by one of application servers 522. From the perspective of device 45, the network address of the destination application/device may be preconfigured at the sending device. For example, the destination address may be of the form a.b.c.d in IPv4. In other implementations, the destination address may be an IPv6 address.

In general, application servers 522 may be any number of devices configured to execute an application that receives data communicated by a deployed LLN device. In one embodiment, application servers 522 may be located within a single data center, different data centers, or even within a cloud environment. In other embodiments, a device closer to the local network of source device 45 may act as the application server. For example, border router BR may itself host the application associated with traffic 506, is as part of a fog-computing implementation.

Figure 5B:
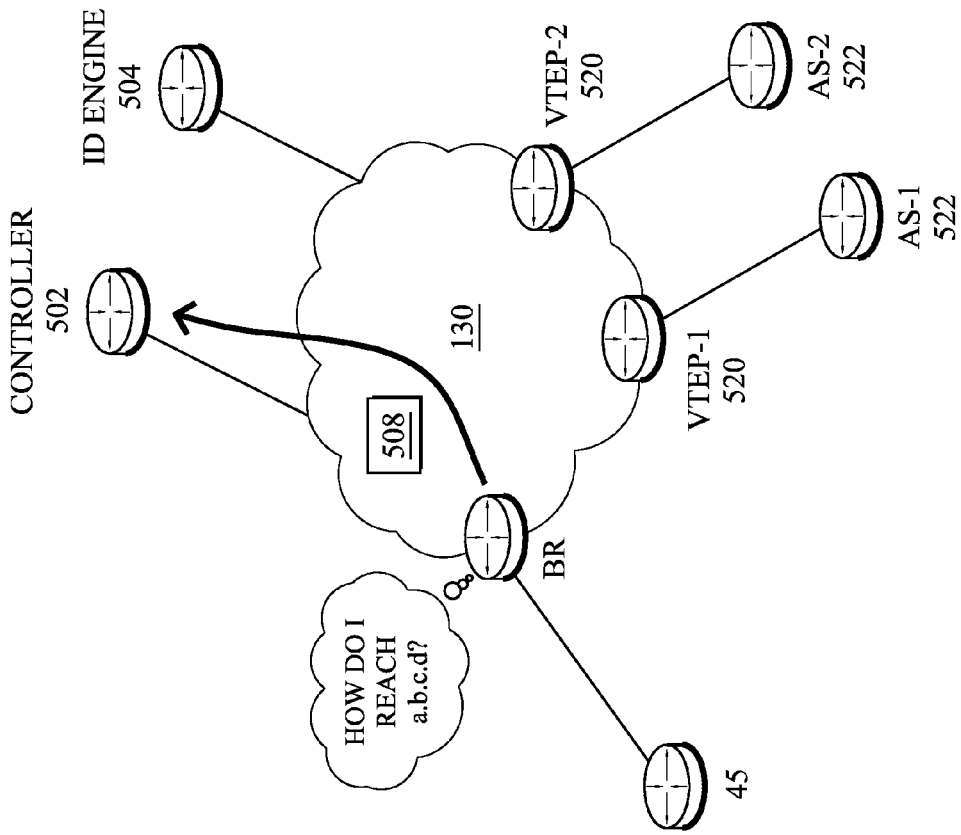

As shown in FIG. 5B, border router BR may send a lookup query 508 to network controller 502 for the destination address. In general, network controller may be operable to control the data plane of the network. For example, controller 502 may be a software defined network (SDN) controller configured to manage network transport, security, and other aspects of the network.

In some embodiments, controller 502 may be configured to manage a VPN tunnel overlay for network 130. For example, controller 502 may implement the Locator/ID Separation Protocol (LISP) by Cisco Systems, Inc., or any other protocol that separates a locator for a device (e.g., the address of the device) from the unique identification of the device. For example, consider the case in which the destination application of traffic 506 is associated with the address a.b.c.d. Traditionally, such an address may correspond to the physical location of the device hosting the application. By using a tunnel overlay, however, this allows for the destination address to be migrated across data centers, to or from the cloud, etc., by updating a routing locator address (RLOC) associated with the address/identifier of the destination endpoint.

Figure 5C:
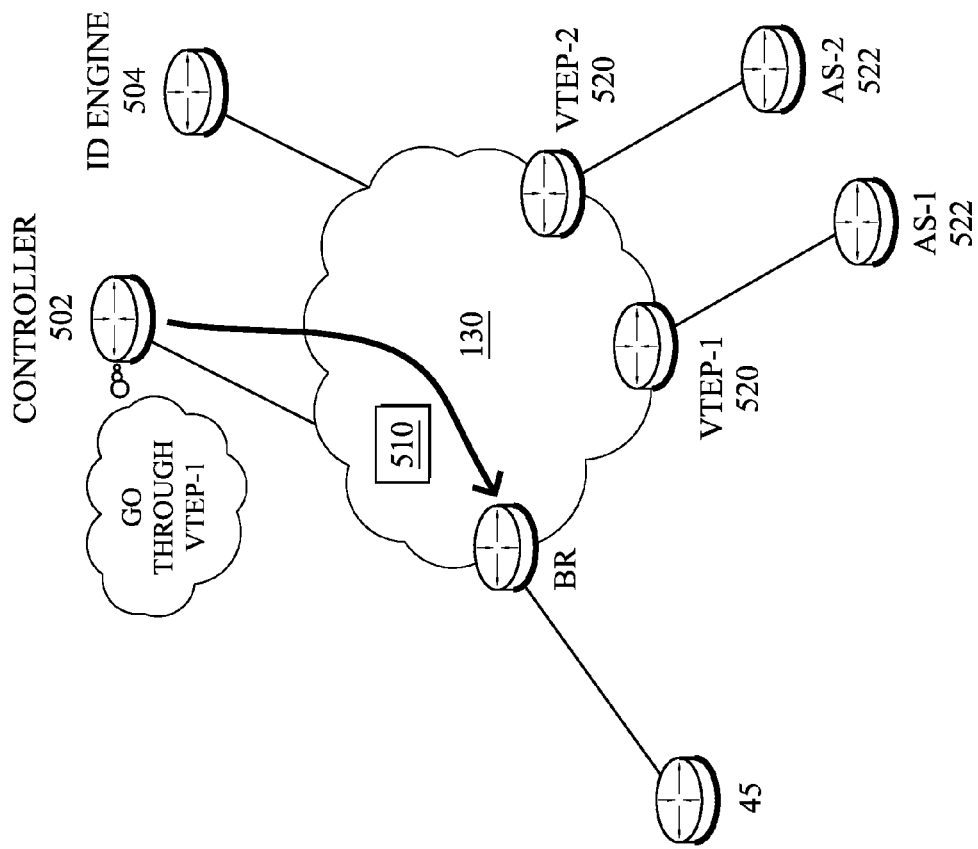

As shown in FIG. 5C, controller 502 may send a response 510 to border router BR that instructs BR to send traffic to an endpoint identifier (a.b.c.d) (e.g., the address of the destination endpoint) via a tunnel to virtual tunnel endpoint (VTEP) router 520, VTEP-1. In doing so, the destination address (a.b.c.d) may be associated with an RLOC for VTEP-1 (e.g., e.f.g.h), thereby allowing the destination to be located in the overlay. For example, a location/identity tuple of <e.f.g.h,a.b.c.d> may be used in the overlay to associate the endpoint identifier with its corresponding RLOC. In other words, such a tuple decouples the endpoint identifier (a.b.c.d) from also representing the location of the corresponding destination by allowing the RLOC to instead be used for purposes of routing decisions within the overlay.

Figure 5D:
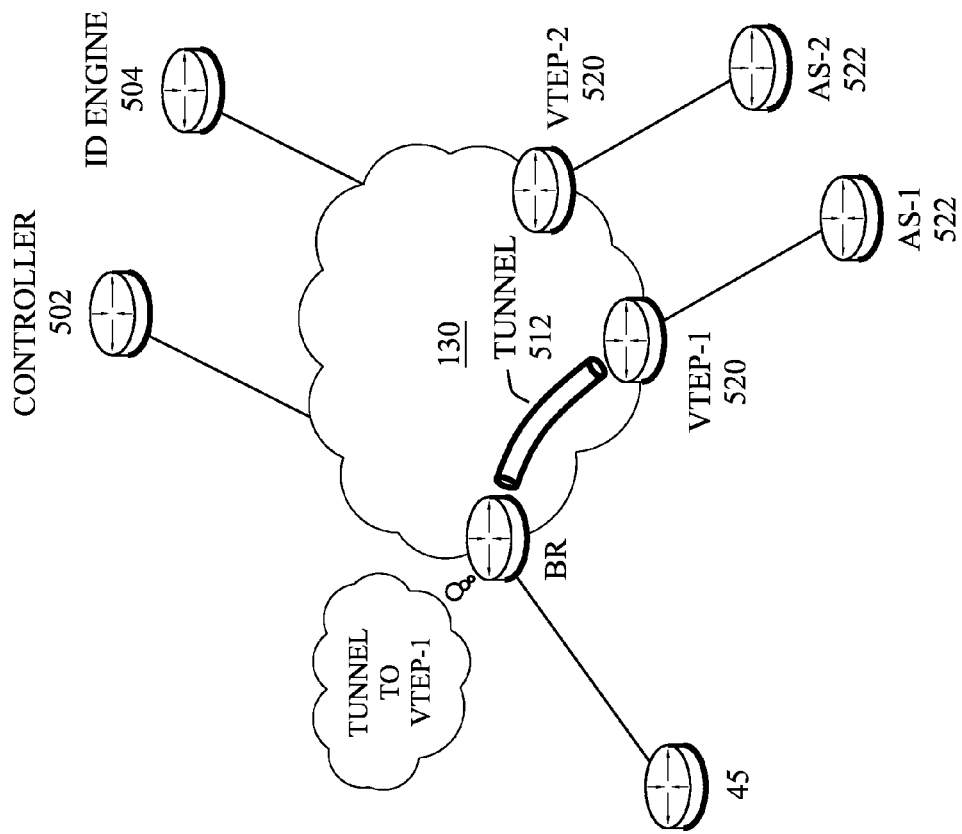

As shown in FIG. 5D, border router BR may establish a VPN tunnel 512 to VTEP-1 over which border router BR may send traffic from device 45 that is addressed is to a.b.c.d. For example, VPN tunnel 512 may be a Generic Routing Encapsulation (GRE) tunnel, in some embodiments. Other tunneling techniques may be used in other embodiments, such as IPsec tunnels or the like. Thus, border router BR may encapsulate any subsequent traffic received from device 45 and tunnel the traffic to VTEP-1. In turn, VTEP-1 may forward the traffic to its destination at AS-1.

Figure 5E:
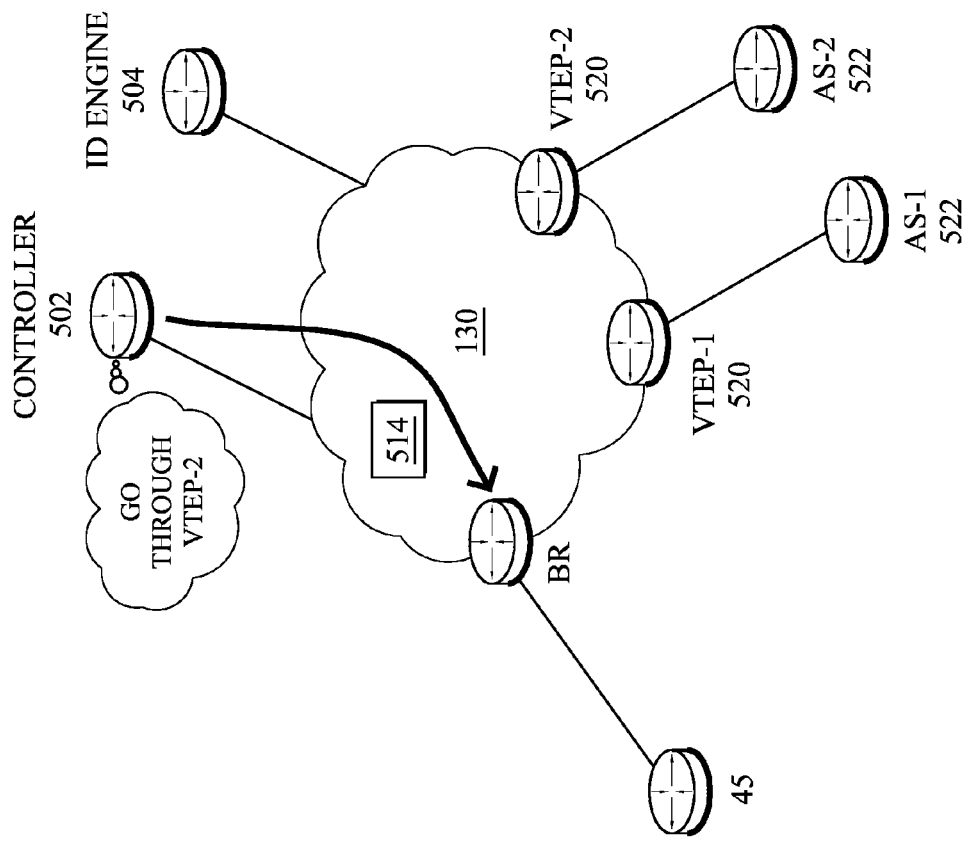

In FIG. 5E, consider the case in which the application hosted by AS-1 is migrated to another hosting device, AS-2. Such a migration may be triggered, for example, by an outage (e.g., to cause the application traffic to be sent to a backup data center), to enable "cloud bursting," (e.g., seamlessly migrating the application to or from the cloud), or the like. In such a case, controller 502 may update the mapping of destination address a.b.c.d (e.g., the endpoint identifier) to be mapped to the RLOC of a different router, such as VTEP-2. For example, the overlay address may be updated to be i.j.k.l.a.b.c.d, where i.j.k.l is the RLOC of VTEP-2. In turn, controller 502 may adjust the tunnel overlay by sending a notification 514 to border router BR indicative of the updated mapping.

Figure 5F:
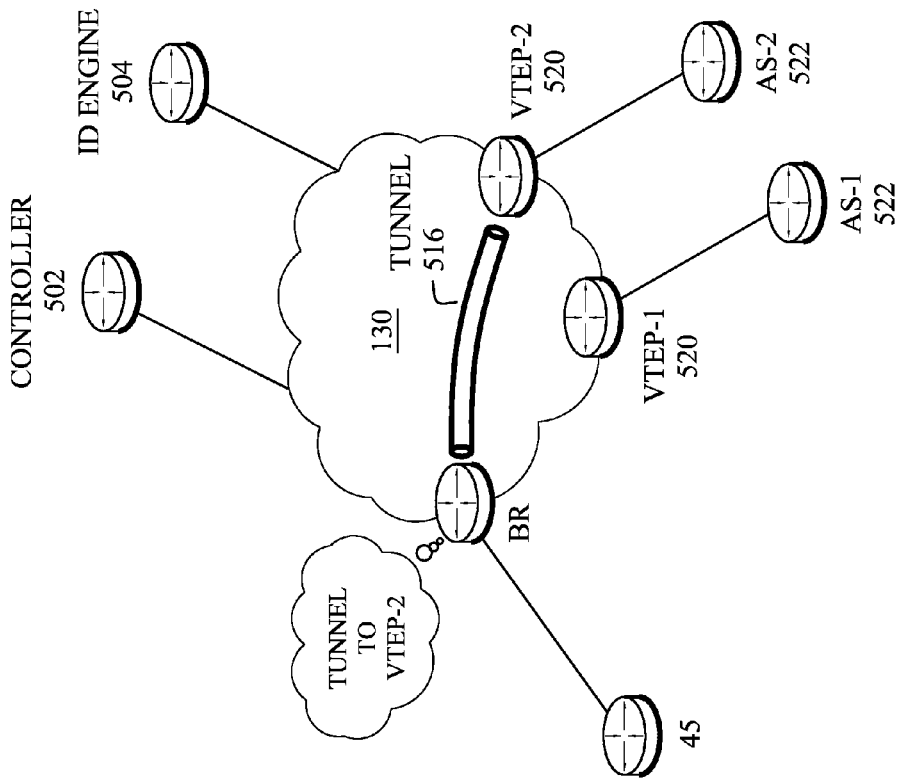

As shown in FIG. 5F, in response to receiving notification 514, border router BR may establish a tunnel 516 to VTEP-2. Once established, border router BR may then begin sending any subsequently received traffic from device 45 that is destined for a.b.c.d to VTEP-2.

Figure 6A:
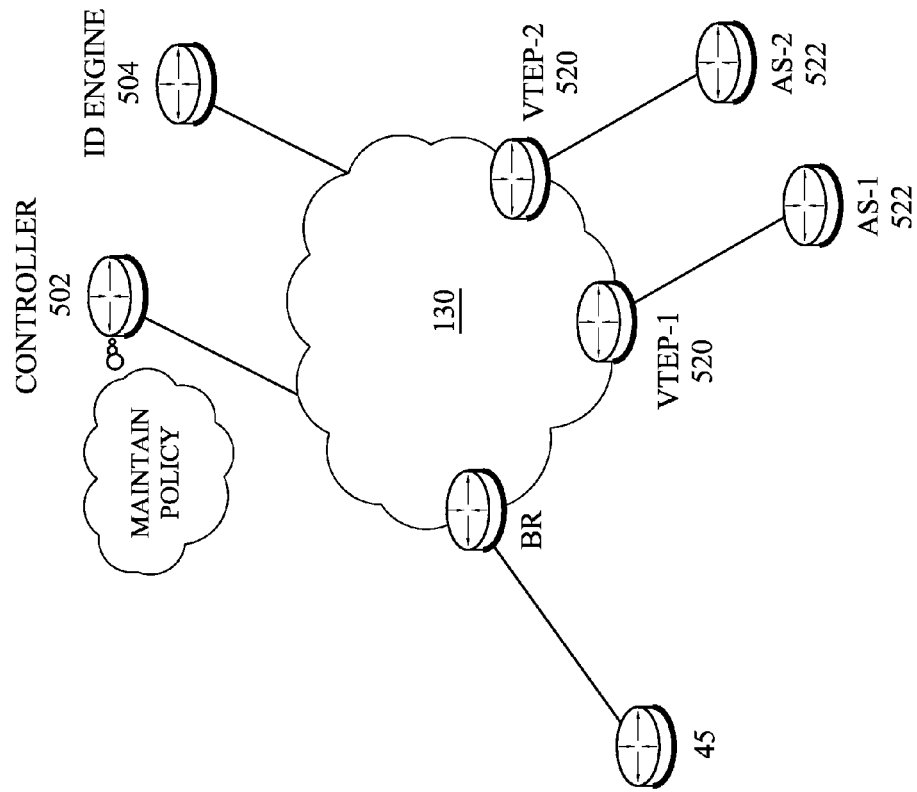
FIGS. 6A-6I illustrate examples of application identification and tunnel overlay provisioning in a network.

Referring now to FIGS. 6A-6I, examples of application identification and tunnel overlay provisioning in a network are illustrated. In various embodiments, an application identification service may be integrated into the framework that implements the programmable tunnel overlay of the network. For example, as shown in FIG. 6A, application identification engine 504 may operate in conjunction with network controller 502, to provide application awareness to the tunnel overlay maintained by controller 502. The application identification services provided by application identification engine 504 may be provided by a separate device as that of network controller 502 or, in other implementations, integrated into a single device.

As shown in FIG. 6A, controller 502 may maintain an intent-based policy interface. Such a policy may, in various embodiments, specify how to identify a deployed device, how to map the device to a particular application, and/or which transport policy should be applied to the application. In some embodiments, network controller 502 may receive the policy from a network administrator via a user interface device. For example, assume that certain nodes/devices in the LLN are security cameras. In such a case, one policy maintained by network controller 502 may include a list of MAC addresses to identify the devices and associate the devices with a particular security application. In addition, the policy may specify that the application traffic flows from these devices must be tunneled to a particular data center and secured with IPsec.

Figure 6B:
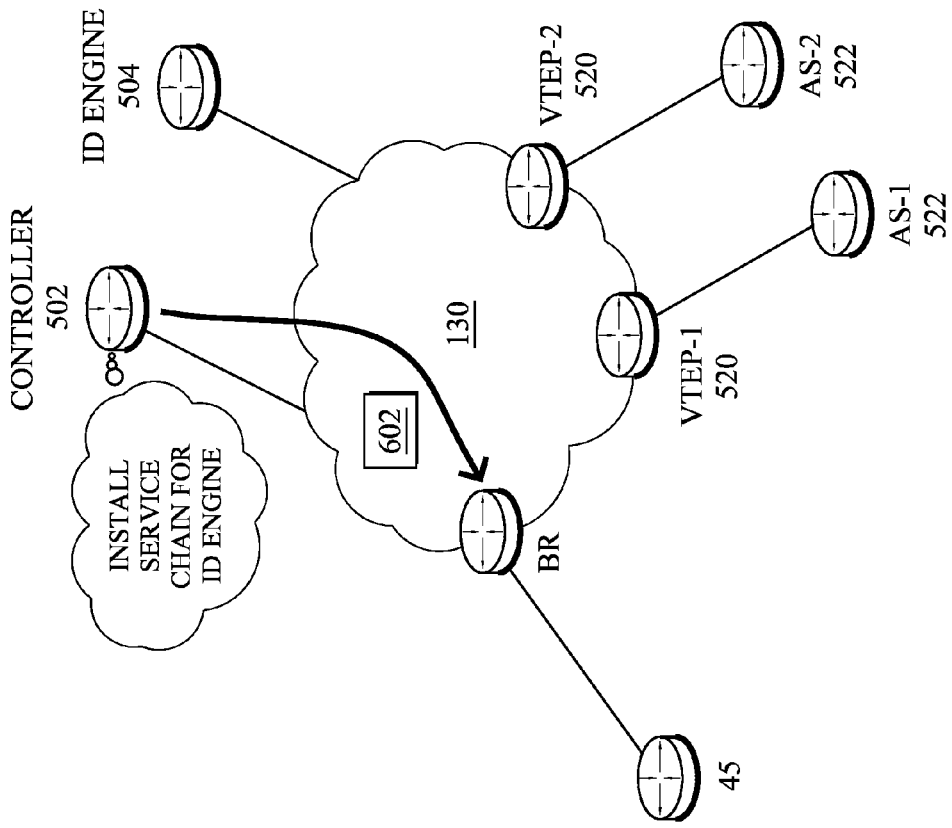

As shown in FIG. 6B, network controller 502 may provide an instruction 602 to border router BR that installs a service chain to application identification engine 504. In general, service chaining refers to the ability in an SDN to apply any number of services to traffic as the traffic is routed through the network. The use of a service may be policy-based, in some cases, such as forwarding the traffic to a given service based on the source address of the traffic, the destination of the traffic, the time of day, etc. For example, service chaining may be used to route the traffic to a service that performs malware detection, caching services, etc., on certain types of traffic in the network. In various embodiments, such a service chain may be established between border router BR and application identification engine 504.

Figure 6C:
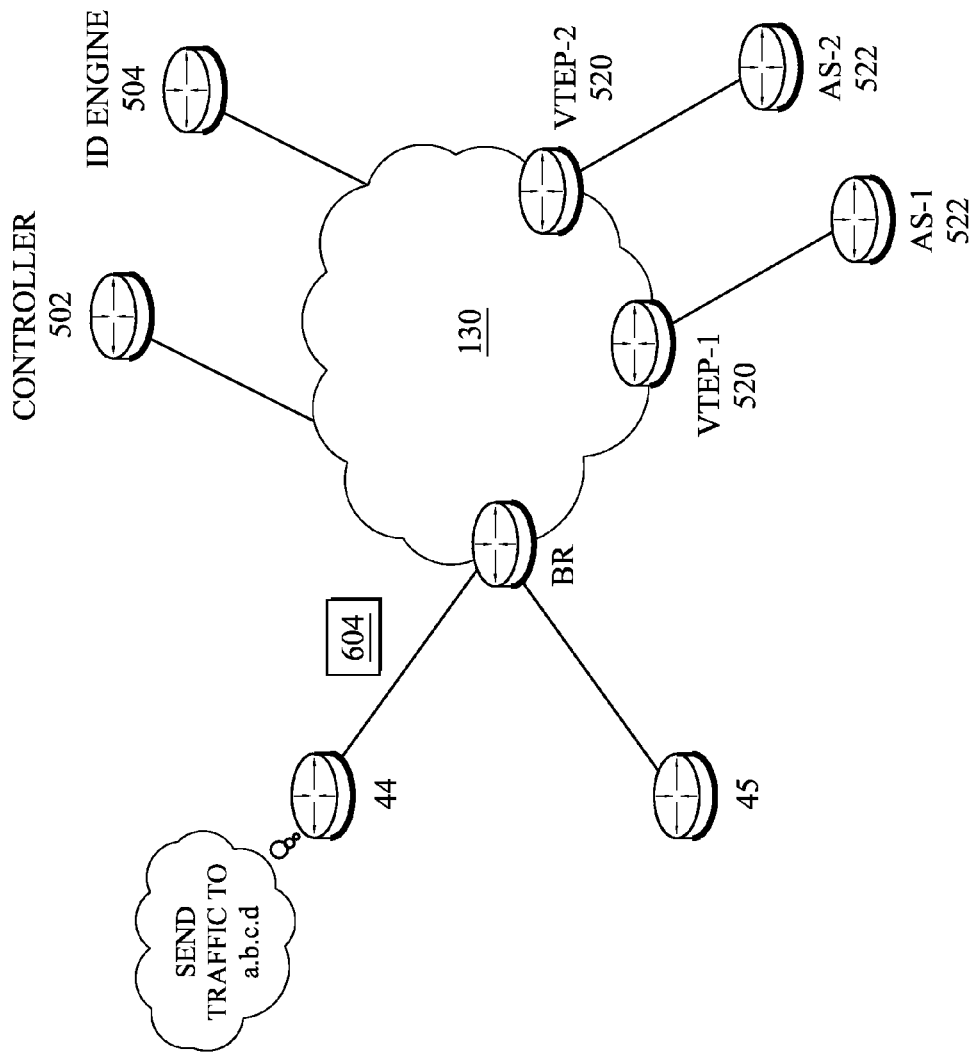

Referring now to FIG. 6C, consider the situation in which a new node/device 44 joins the local network serviced by border router BR and begins sending application traffic 604 towards the server address of the application. For example, assume that device 44 is a newly installed security camera that is being added to the local LLN.

Figure 6D:
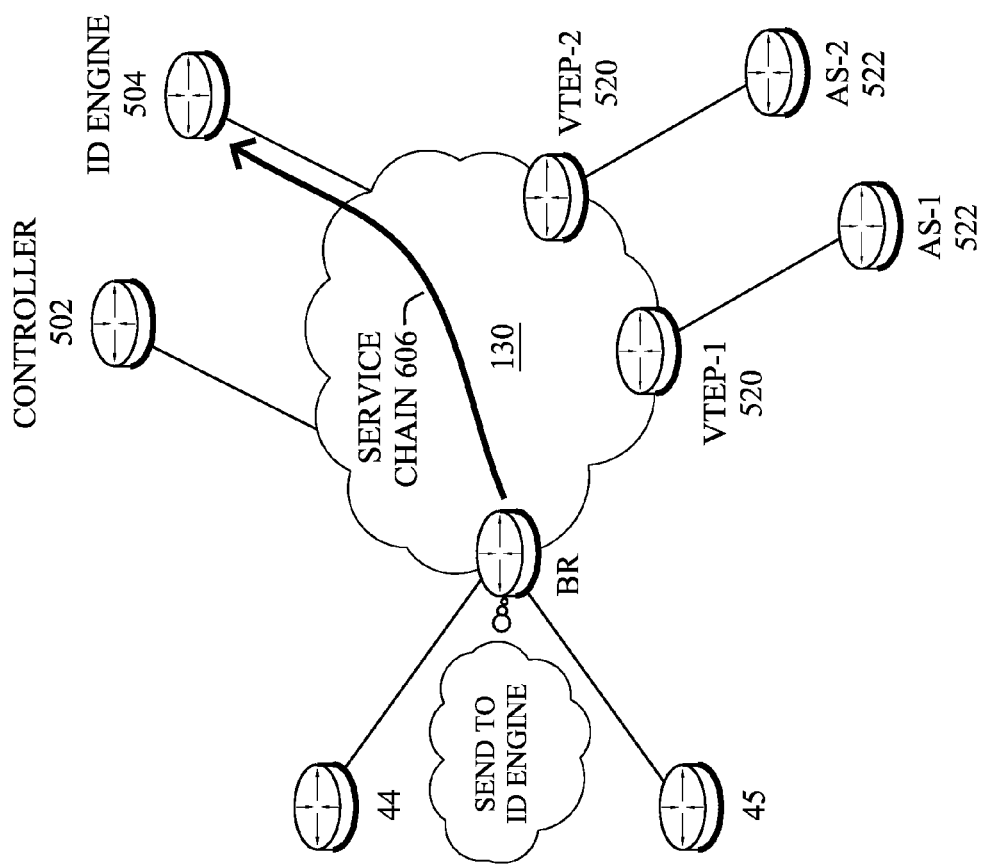

As shown in FIG. 6D, border router BR may determine whether application traffic 604 should be sent via the service chain 606 installed by controller 502 between border router BR and the application identification service of engine 504. For example, if border router BR determines that device 44 is unrecognized (e.g., based on the MAC/Layer-2 address of device 44, etc.), border router BR may send application traffic 604 via service chain 606 to the application identification service. In some embodiments, service chain 606 may be implemented by inserting an appropriate Network Service Header (NSH) into traffic 604 or other service chaining mechanism, to cause traffic 604 to be sent to the application identification service.

Figure 6E:
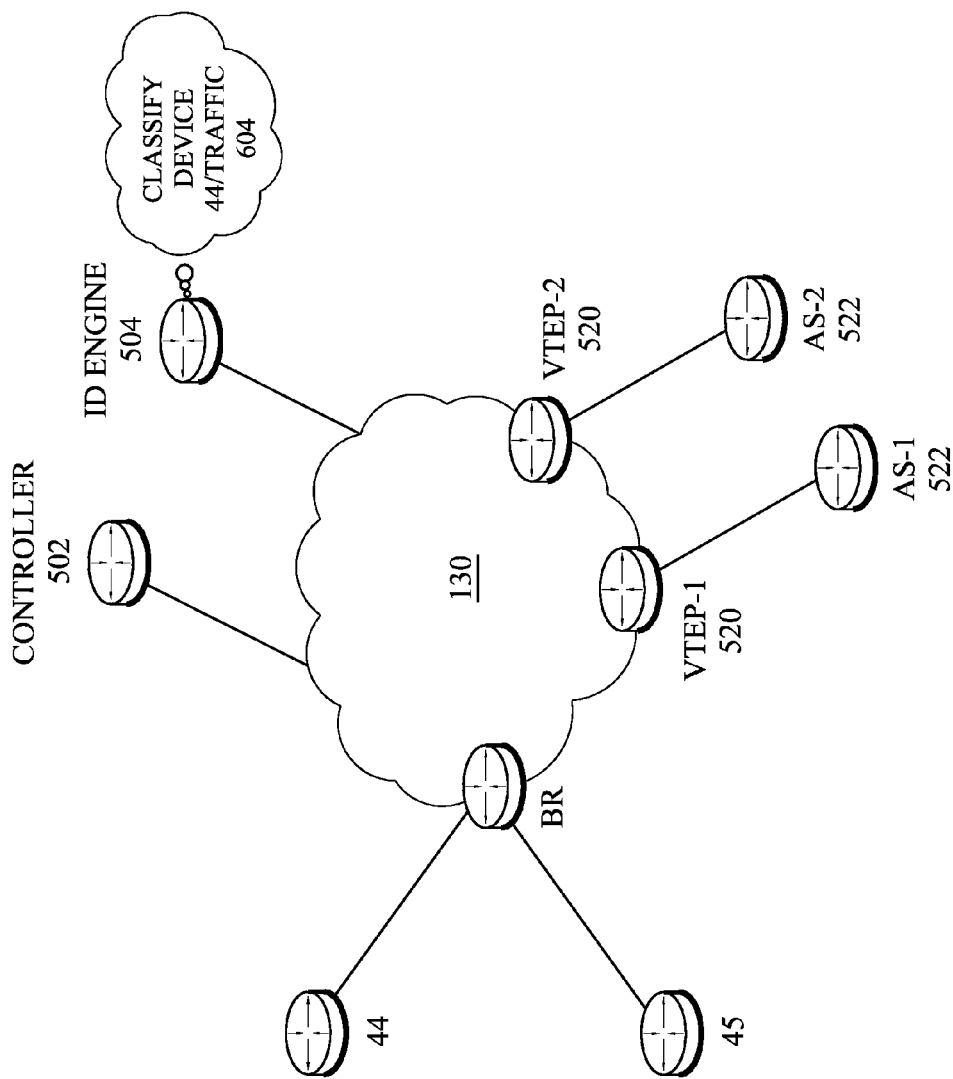

In FIG. 6E, application identification engine 504 may analyze traffic 604 to classify application traffic 604 and its sending device 44. For example, application identification engine 504 may be an Identity Service Engine by Cisco Systems, Inc., or another device operable to identify the application associated with a particular flow of traffic. For example, application identification engine 504 may use the policy maintained by network controller 502 to classify the application of traffic 604 based on the MAC address of the source device 44. In other embodiments, application identification engine 504 may identify the application associated with traffic 604 using other mechanisms such as, e.g., deep packet inspection (DPI), based on 802.1x information included in traffic 604, or the like.

Figure 6F:
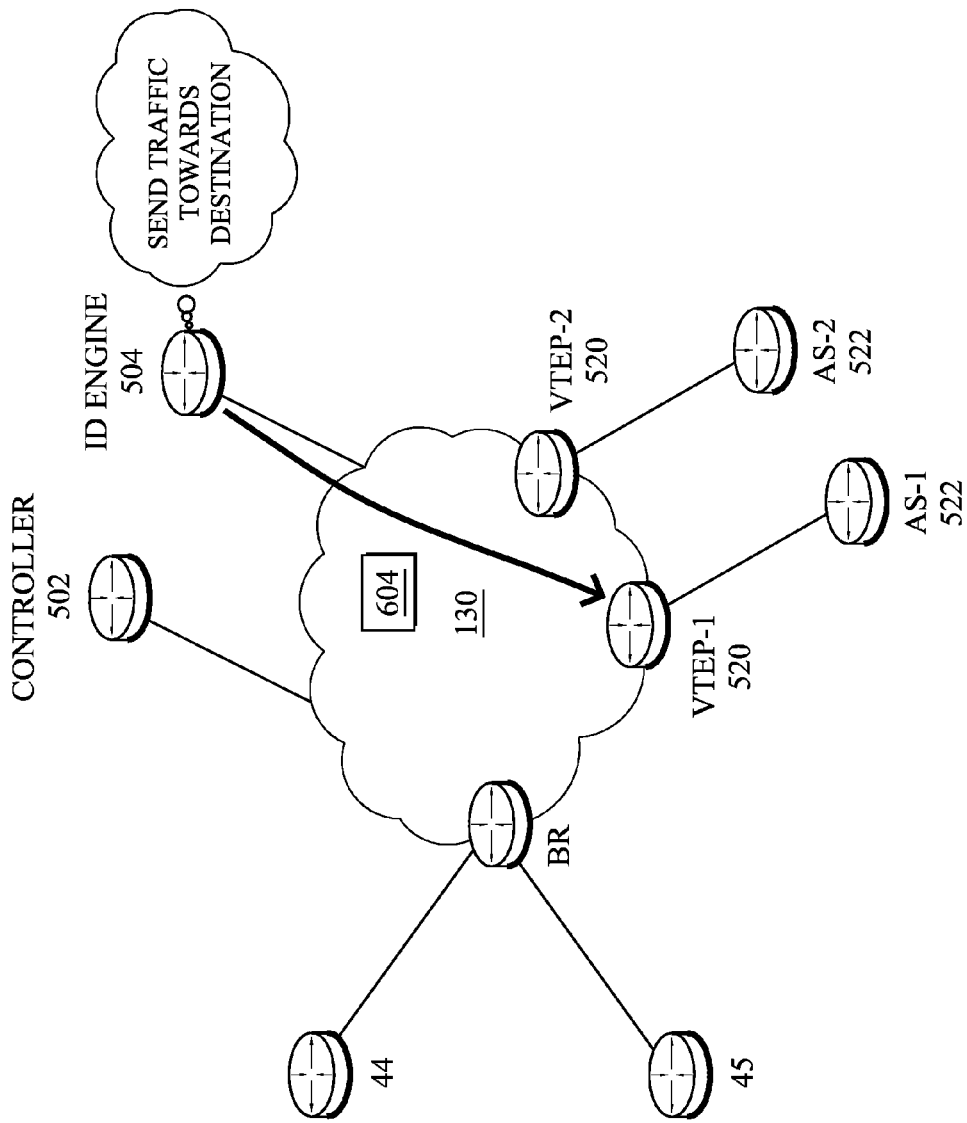

In FIG. 6F, after classifying traffic 604, the application identification service of engine 504 may forward the application traffic 604 towards its destination according to the policy associated with the identified application. For example, application identification engine 504 may determine, based on the policy, that traffic associated with the identified application should be sent via the overlay to router VTEP-1. In turn, engine 504 may re-encapsulate traffic 604 accordingly and send traffic 604 on to router VTEP-1.

Figure 6G:
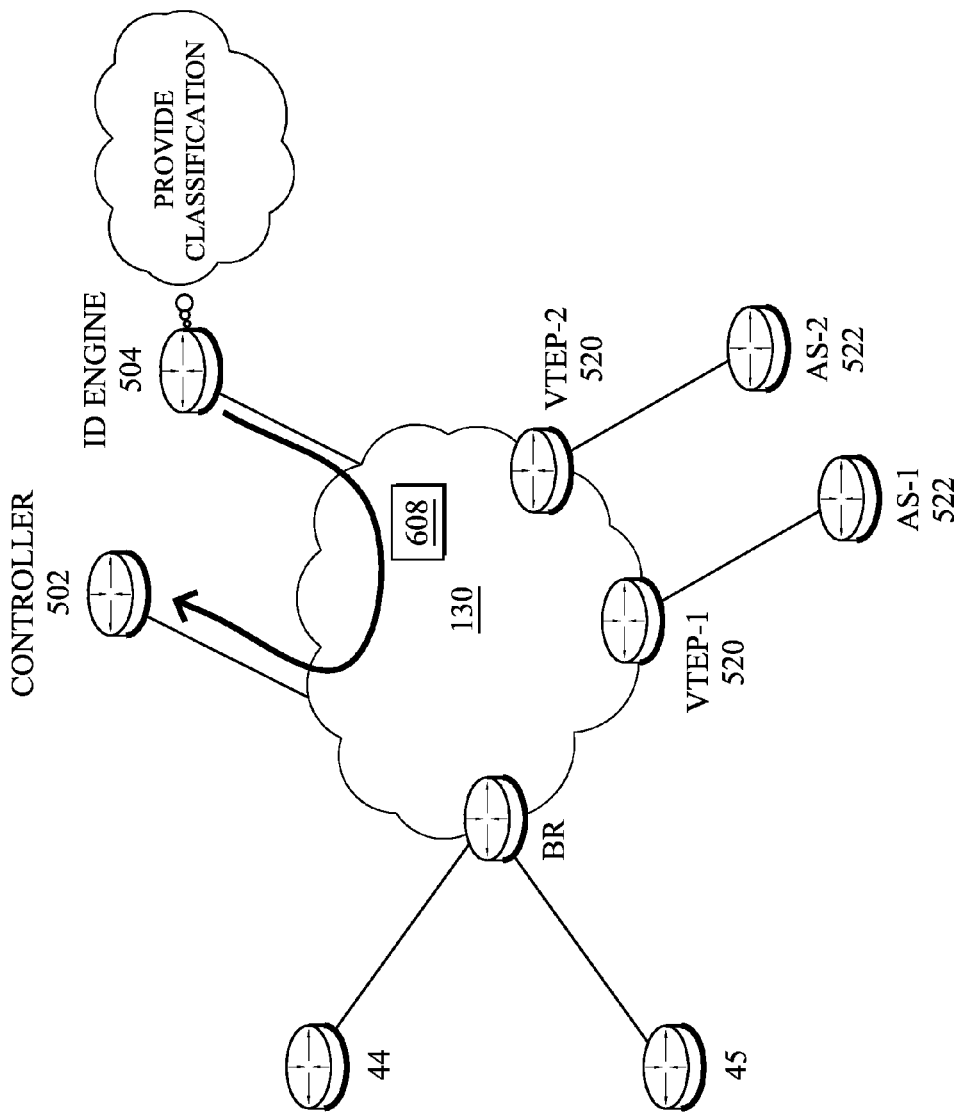

In FIG. 6G, once traffic 604 has been classified, the application identification service may also provide an indication 608 of the classification to network controller 502, to cause network controller 502 to provision the tunnel overlay for application traffic 604 based on the received classification. For example, the policy associated with the application may specify the VTEP to which traffic associated with the application should be sent (e.g., by associating the application with an RLOC or other overlay-specific address), any security mechanisms that should be applied to the application traffic, etc.

Figure 6H:
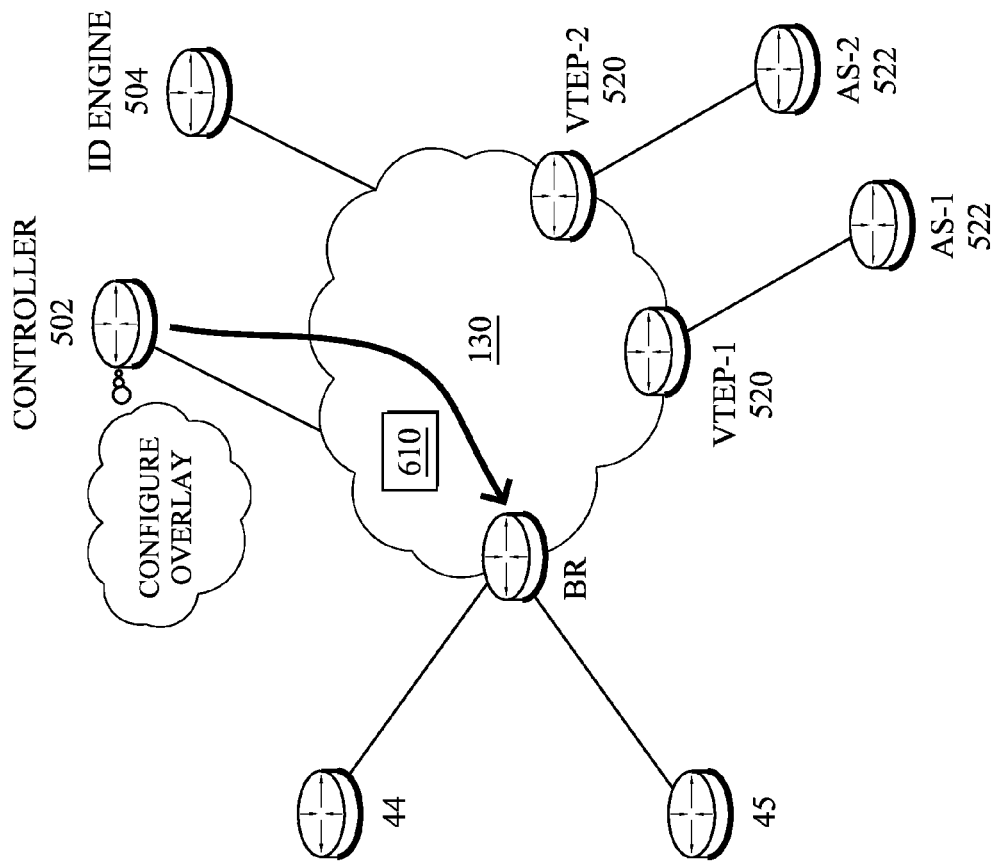

As shown in FIG. 6H, in response to determining the appropriate overlay configuration for application traffic 604, network controller 502 may send an instruction 610 back to border router BR. In various embodiments, instruction 610 may include an indication of the VTEP to which border router BR is to send application traffic 604 from device 44.

Figure 6I:
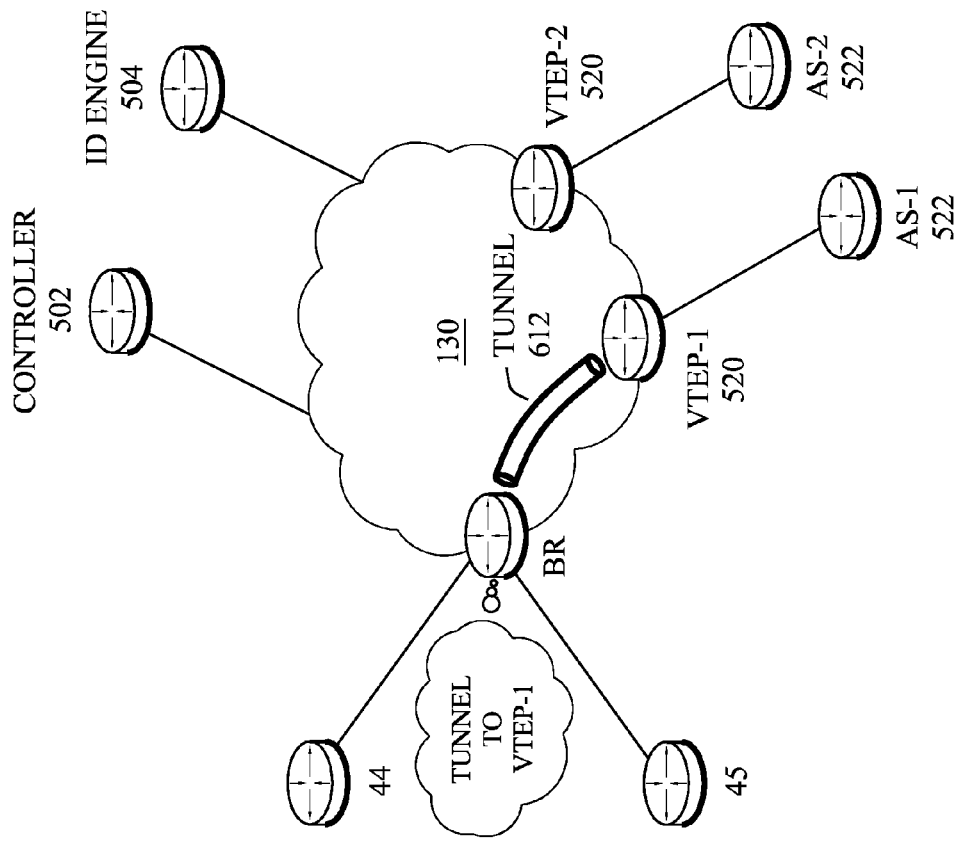

In FIG. 6I, in response to receiving instruction 610, border router BR may establish tunnel 612 to the specified VTEP of the overlay, such as VTEP-1. After doing so, border router BR may send any subsequent application traffic received from device 44 towards VTEP-1 via tunnel 612. Since tunnel 612 is now part of the overlay, controller 502 may dynamically cause an endpoint of tunnel 612 to change (e.g., to migrate the application service at the backend across data centers, etc.). For example, if the application service at AS-1 is migrated to AS-2, controller 502 may cause border router BR to change tunnel 612 to terminate instead at VTEP-2 instead of VTEP-1.

Figure 7:
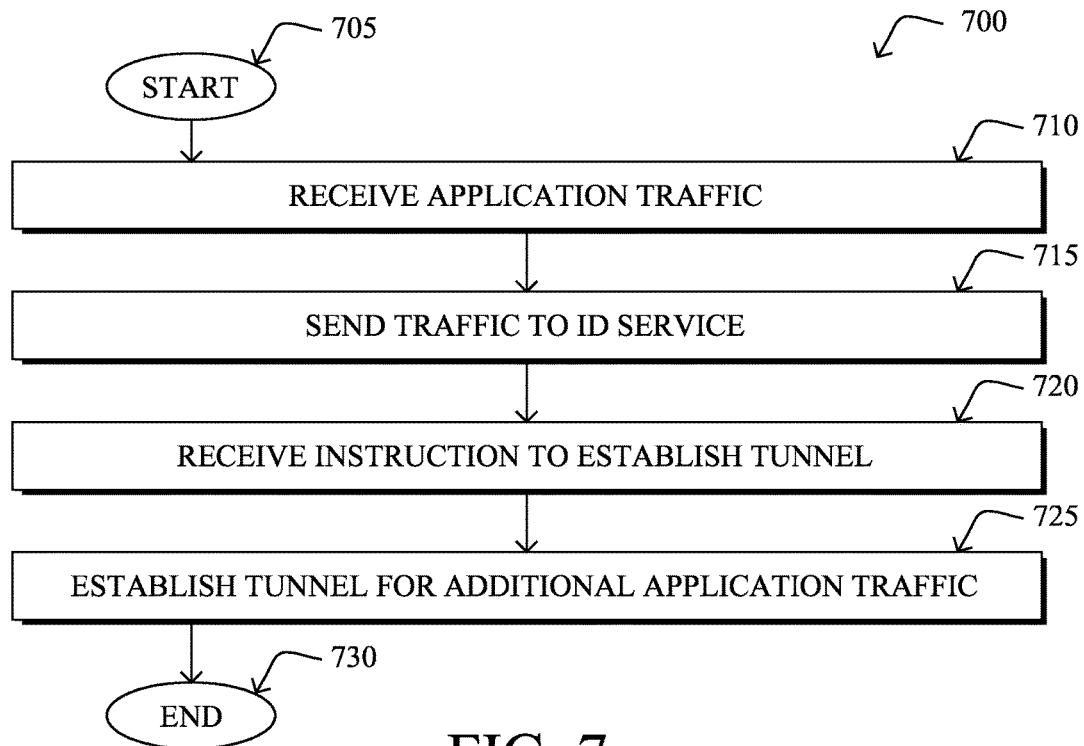
FIG. 7 illustrates an example simplified procedure for facilitating application identification and tunnel overlay provisioning.

Referring now to FIG. 7, an example simplified procedure for facilitating application identification and tunnel overlay provisioning is shown, according to various embodiments. In general, procedure 700 may be performed by a first electronic device in a network (e.g., device 200) by executing stored instructions (e.g., process 248). Procedure 700 begins at step 705 and continues on to step 710 where, as described in greater detail above, the device may receive application traffic sent by a source device towards a destination address.

At step 715, as detailed above, the first device may forward the received traffic to an application identification service. In some embodiments, the service may be operable to classify the traffic and the traffic source. For example, the service may analyze the traffic itself, the MAC/Layer-2 address of the source device, etc., to determine which application is associated with the traffic.

At step 720, the first device may receive an instruction to establish a tunnel via which the first device is to send application traffic from the source device towards the is destination address, as described in greater detail above. In some embodiments, the instruction may be based on the classification of the application traffic by the application identification service. For example, the application identification engine may provide an indication of the classified traffic to a network controller that maintains a tunnel based overlay for application traffic in the network.

At step 725, as detailed above, the first device may establish the tunnel, to send application traffic from the source device towards the destination address. The established tunnel may be of any type, such as a GRE tunnel, IPsec tunnel, combinations thereof, or the like. Thus, any subsequent application traffic received by the first device may be sent towards the destination via the established tunnel. In other words, once the source device and its application traffic are known to the network, the tunnel based overlay may be adjusted accordingly, to accommodate this traffic. Procedure 700 then ends at step 730.

Figure 8:
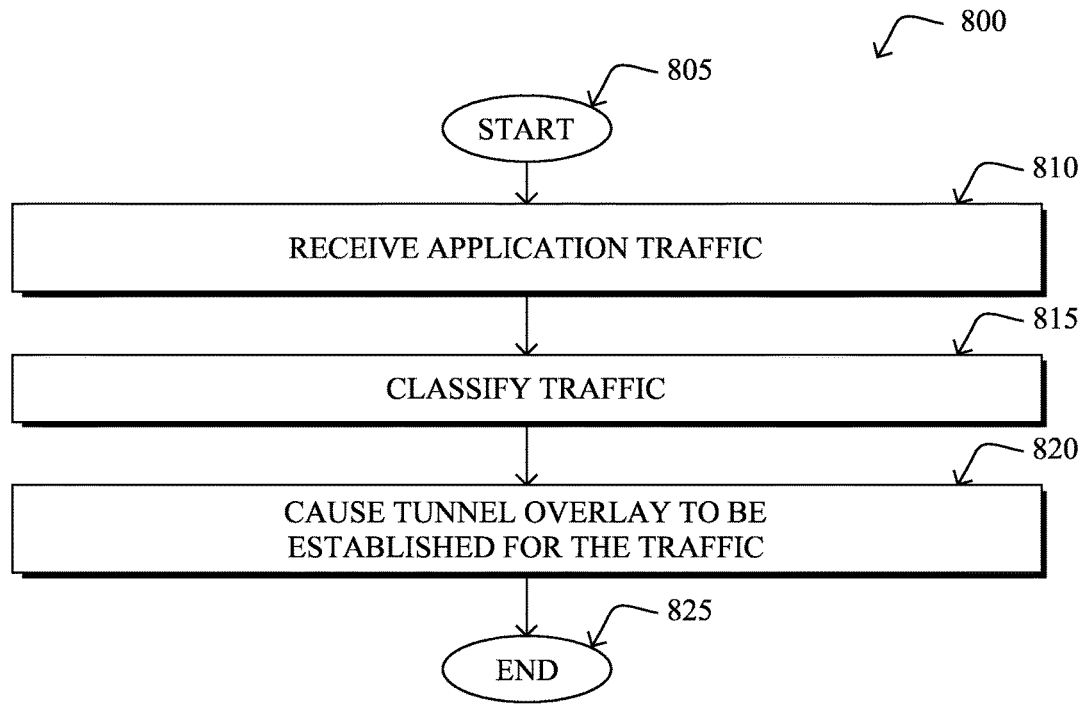
FIG. 8 illustrates an example simplified procedure for classifying application traffic and causing a tunnel overlay to be provisioned.

Referring now to FIG. 8, an example simplified procedure is shown for classifying application traffic and causing a tunnel overlay to be provisioned, according to various embodiments. Generally, procedure 800 may be performed by a first device in a network (e.g., device 200) that, e.g., executes an application identification service. Procedure 800 may begin at step 805 and continue on to step 810 where, as described in greater detail above, the first device may receive application traffic that was sent by a source device towards a destination address. In various embodiments, the application traffic may be redirected to the first device using service chaining. For example, application traffic sent by a new/unknown source device may be forwarded to the first device by use of a service chaining header appended to the application traffic by a border router of the local network of the source device.

At step 815, as detailed above, the first device may classify the application traffic. In general, classification may entail identifying the specific application associated with the traffic, the type of application associated with the traffic, determining a priority for the traffic, determining security requirements for the traffic, or the like. The first device may classify the traffic in any number of ways. In some cases, the first device may classify the application traffic based on the MAC/Layer-2 address of the source device. Such mappings may be included in a network policy.

At step 820, the first device may cause a network tunnel overlay to be established in the network for the application traffic, as described in greater detail above. In some embodiments, the first device/application identification service may provide an indication of the classification to a network controller. Such a network controller may be responsible for installing and maintaining a tunnel based overlay for different types of traffic in the network. In turn, the network controller may instruction or more routers (e.g., the border router associated with the source of the traffic) to establish a tunnel via which further traffic from the source device is to be sent. Procedure 800 then ends at step 825.

It should be noted that while certain steps within procedures 700-800 may be optional as described above, the steps shown in FIGS. 7-8 are merely examples for purposes of illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for the automatic identification of applications and provisioning of a network transport policy to support the applications (e.g., using a tunnel overlay that separates the identifier/address of the destination endpoint from the locator for the endpoint). In addition, the techniques herein also provide better visibility into the encapsulated traffic, allowing sophisticated polices and data mining to be implemented. Notably, in the traditional endpoint based tunneling, it is very hard to know what the application is doing since the endpoint often encrypts the traffic to the application server.

While there have been shown and described illustrative embodiments that provide for the automatic provisioning of a network based on classified application traffic, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of computing networks. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a first device in a network, application traffic sent from a source device towards a destination address;
   sending, by the first device, the application traffic to a traffic identification service on a second device that identifies an application associated with the application traffic, wherein the second device classifies the application traffic and the source device;
   receiving, at the first device from a third device in the network, an instruction to establish a network tunnel to send the application traffic from the source device towards the destination address, wherein the instruction to establish the network tunnel is based on the identified application; and
   upon receiving the instruction from the third device, establishing, by the first device, the network tunnel to send the application traffic from the source device towards the destination address, wherein the network tunnel is provisioned based on the identified application, and
   wherein the first device, the second device and the third device are different devices in the network.

2. The method as in claim 1, further comprising:
   receiving, at the first device and subsequent to establishing the network tunnel, additional application traffic sent from the source device towards the destination address; and
   sending, by the first device, the additional application traffic encapsulated in the network tunnel.

3. The method as in claim 1, wherein the first device sends the application traffic to the traffic identification service using service chaining.

4. The method as in claim 1, further comprising:
   receiving, at the first device and in response to the destination address migrating in the network, a second instruction to establish a second network tunnel to send the application traffic from the source device towards the destination address, wherein the second network tunnel is terminated at a different router than that of the first network tunnel.

5. The method as in claim 1, wherein the instruction to establish the network tunnel is received by the first device from a network controller, in response to the network controller receiving the classification of the application traffic by the identification service.

6. The method as in claim 5, wherein the network controller is operable to maintain a tunnel overlay for the network based on one or more policies, wherein a given policy identifies a particular application and a transport policy for the particular application in the tunnel overlay.

7. A method comprising:
receiving, at a first device in a network, application traffic sent from a source device towards a destination address, wherein the application traffic is received from a second device in the network;
classifying, by the first device, the application traffic and the source device using a traffic identification service, wherein the traffic identification service identifies an application associated with the application traffic; and
notifying, by the first device, a third device of the identified application, wherein the notification causes the third device to generate a tunnel overlay to be established in the network for the classified application traffic based on the identified application at the second device, wherein the first device, the second device and the third device are different devices in the network.

8. The method as in claim 7, wherein the application traffic is redirected to the first device using service chaining.

9. The method as in claim 7, wherein the first device classifies the application traffic based on a Layer-2 address of the source device.

10. The method as in claim 7, wherein causing the tunnel overlay to be established in the network comprises:
providing, by the first device, an indication of the classified application traffic to a network controller, wherein the network controller is operable to maintain the tunnel overlay for the network based on one or more policies, and wherein a given policy identifies a particular application and a transport policy for the particular application in the tunnel overlay.

11. The method as in claim 10, further comprising:
forwarding, by the first device, the received application traffic towards the destination address based on the transport policy.

12. An apparatus, comprising:
one or more network interfaces to communicate with a network;
a processor coupled to the network interfaces and configured to execute one or more processes; and
a memory configured to store a process executable by the processor, the process when executed operable to:
receive application traffic sent from a source device towards a destination address;
send the application traffic to a traffic identification service on a first remote device, that identifies an application associated with the application traffic, wherein the first remote device classifies the application traffic and the source device;
receive, from a second remote device in the network, an instruction to establish a network tunnel to send the application traffic from the source device towards the destination address, wherein the instruction to establish the network tunnel is based on the identified application; and
upon receiving the instruction from the third device, establish the network tunnel to send the application traffic from the source device towards the destination address, wherein the network tunnel is provisioned based on the identified application, and
wherein the first remote device and the second remote device are different devices in the network.

13. The apparatus as in claim 12, wherein the process when executed is further operable to:
receive, subsequent to establishing the network tunnel, additional application traffic sent from the source device towards the destination address; and
send the additional application traffic encapsulated in the network tunnel.

14. The apparatus as in claim 12, wherein the application traffic is sent to the traffic identification service using service chaining.

15. The apparatus as in claim 12, wherein the process when executed is further operable to:
receive, in response to the destination address migrating in the network, a second instruction to establish a second network tunnel to send the application traffic from the source device towards the destination address, wherein the second network tunnel is terminated at a different router than that of the first network tunnel.

16. The apparatus as in claim 12, wherein the instruction to establish the network tunnel is received from a network controller, in response to the network controller receiving the classification of the application traffic by the identification service.

17. The apparatus as in claim 12, wherein the network controller is operable to maintain a tunnel overlay for the network based on one or more policies, wherein a given policy identifies a particular application and a transport policy for the particular application in the tunnel overlay.

18. An apparatus, comprising:
one or more network interfaces to communicate with a network;
a processor coupled to the network interfaces and configured to execute one or more processes; and
a memory configured to store a process executable by the processor, the process when executed operable to:
receive, from a first remote device, application traffic sent from a source device towards a destination address via the first remote device;
classify the application traffic and the source device using a traffic identification service, wherein the traffic identification service identifies an application associated with the traffic; and
notify a second remote device of the identified application, wherein the notification causes the second remote device to generate a tunnel overlay to be established in the network for the classified application traffic based on the identified application, wherein the apparatus, the first remote device and the second remote device are different devices in the network.

19. The apparatus as in claim 18, wherein the application traffic is redirected to the apparatus using service chaining.

20. The apparatus as in claim 18, wherein the apparatus classifies the application traffic based on a Layer-2 address of the source device.

21. The apparatus as in claim 18, wherein the apparatus causes the tunnel overlay to be established in the network by:
providing an indication of the classified application traffic to a network controller, wherein the network controller is operable to maintain the tunnel overlay for the network based on one or more policies, and wherein a given policy identifies a particular application and a transport policy for the particular application in the tunnel overlay.

22. The apparatus as in claim 18, wherein the process when executed is further operable to:

forward the received application traffic towards the destination address based on the transport policy.

* * * * *

UNITED STATES PATENT AND TRADEMARK OFFICE
CERTIFICATE OF CORRECTION

PATENT NO. : 9,887,936 B2
APPLICATION NO. : 14/816406
DATED : February 6, 2018
INVENTOR(S) : Fabio Maino et al.

Page 1 of 1

It is certified that error appears in the above-identified patent and that said Letters Patent is hereby corrected as shown below:

In the Specification

In Column 3, Line 37, please amend as shown:
over links 105 coupled to the network 100. The network In Column 5, Line 27, please amend as shown:
"IoT" may be used by those in the art to refer to uniquely In Column 7, Line 19, please amend as shown:
that conveys destination information upwards along the In Column 7, Line 62, please amend as shown:
of message (e.g., a RPL control message), and a specific In Column 9, Line 53, please amend as shown:
host the application associated with traffic 506, as part of In Column 10, Line 26, please amend as shown:
may send traffic from device 45 that is addressed to Signed and Sealed this
First Day of December, 2020

Andrei Iancu
*Director of the United States Patent and Trademark Office*